(12) United States Patent
Venkatachalam

(10) Patent No.: US 8,638,731 B2
(45) Date of Patent: Jan. 28, 2014

(54) FEMTOCELL ARCHITECTURE AND NETWORK

(75) Inventor: Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 758 days.

(21) Appl. No.: 12/645,045

(22) Filed: Dec. 22, 2009

(65) Prior Publication Data

US 2011/0149876 A1    Jun. 23, 2011
US 2012/0281635 A9    Nov. 8, 2012

Related U.S. Application Data

(60) Provisional application No. 61/223,360, filed on Jul. 6, 2009.

(51) Int. Cl.
*H04W 4/00* (2009.01)
*H04L 12/66* (2006.01)

(52) U.S. Cl.
USPC ............ 370/329; 370/353; 370/354; 370/355

(58) Field of Classification Search
USPC ................... 370/328, 329, 352–356
See application file for complete search history.

(56) References Cited

U.S. PATENT DOCUMENTS

| 2009/0264077 A1* | 10/2009 | Damnjanovic ............... 455/63.1 |
| 2009/0280776 A1* | 11/2009 | Chen et al. .................... 455/411 |
| 2010/0267386 A1* | 10/2010 | Lim et al. ....................... 455/436 |
| 2011/0069673 A1* | 3/2011 | Oswal et al. ................... 370/331 |

FOREIGN PATENT DOCUMENTS

| WO | WO 2011003004 | * | 1/2011 | ............ H04W 12/06 |
| WO | WO 2011/053663 | * | 5/2011 | .............. H04W 4/00 |

OTHER PUBLICATIONS

Kim, WiMax Femtocell: Requirements, Challenges, and Solutions, Sep. 2009, IEEE Communications Magazine, p. 84-91.*

* cited by examiner

*Primary Examiner* — Ronald Abelson
(74) *Attorney, Agent, or Firm* — Blakely, Sokoloff, Taylor & Zafman LLP

(57) ABSTRACT

A femtocell architecture and network are described. In one example the femtocell has a wireless access point having a first communications interface for wireless communications with a subscriber unit and a second communications interface for communications with a cellular radio communications system, and a secure gateway between the access point and the cellular system to secure communications between the access point and the cellular system.

18 Claims, 3 Drawing Sheets

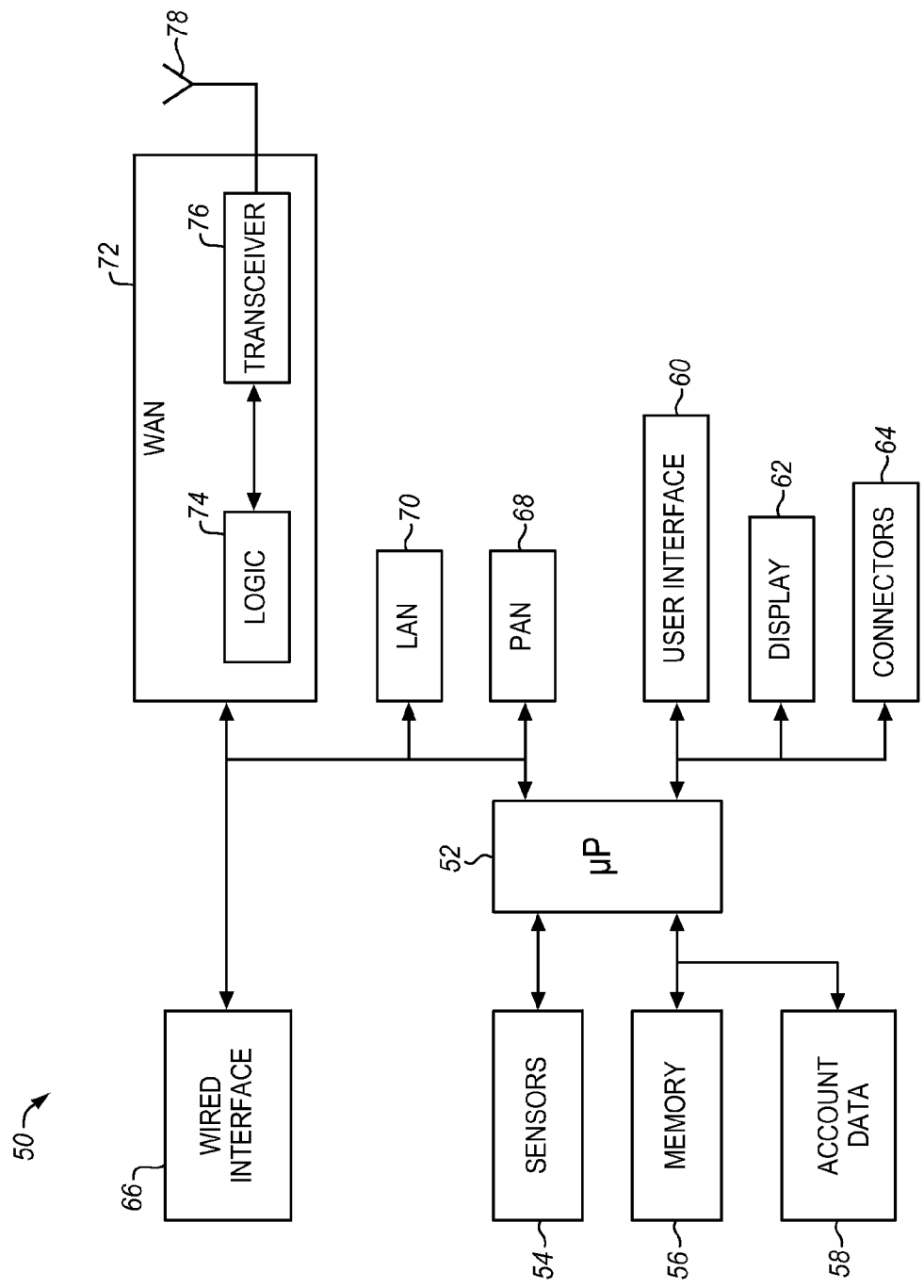

FEMTOCELL ARCHITECTURE AND NETWORK

CROSS-REFERENCE TO RELATED APPLICATIONS

This application claims the benefit of U.S. Provisional Application No. 61/223,360, filed Jul. 6, 2009.

FIELD

The present description relates to an architecture for a terminal in a wireless cellular radio communications system, and in particular, to an architecture for femtocells that can integrated into a larger communications system.

BACKGROUND

A cellular communications system typically has base stations distributed throughout an area to provide data connectivity throughout the area. The cellular system allows wireless communications to use less power and it allows frequencies to be reused by different subscribers connected to different base stations. Each base station connects through a communications infrastructure to a communications backbone to connect to other subscribers and to users and systems outside the cellular system.

A conventional base station is referred to as communicating within a cell or, sometimes, a macrocell of the cellular system. A macrocell may have a cross-section of several miles. To further extend a cellular system, microcells have been used to serve a smaller area. This is useful in extremely dense urban areas to allow frequencies to be reused within smaller areas. Microcells are also used to extend the range of a system beyond the reach of a base station at lower cost than a typical base station. To augment systems of macrocells, and microcells, nanocells, picocells, and femtocells are used, each corresponding to a smaller base station.

For WiMAX (a set of standards promulgated by the WiMAX forum), a femto cell is centered around a WiMAX Femto Access point (WFAP), a low-power WiMAX Base Station, operating in licensed band to connect to subscribers. It is intended to provide service for a limited number of concurrent users over small areas such as a home or a SOHO (small office, home office) environment. To connect to the cellular network it uses a shared broadband connection. This connection can be operated by a different service provider.

Ideally, the WFAP also supports some mobility for the subscriber and allows the subscriber to be handed over to a macrocell base station.

BRIEF DESCRIPTION OF THE DRAWINGS

Embodiments of the present invention are illustrated by way of example, and not limitation, in the figures of the accompanying drawings in which like reference numbers are used to refer to like features, and in which:

FIG. 3 is a block diagram of a radio terminal or station according to an embodiment of the invention.

DETAILED DESCRIPTION

Figure 1:
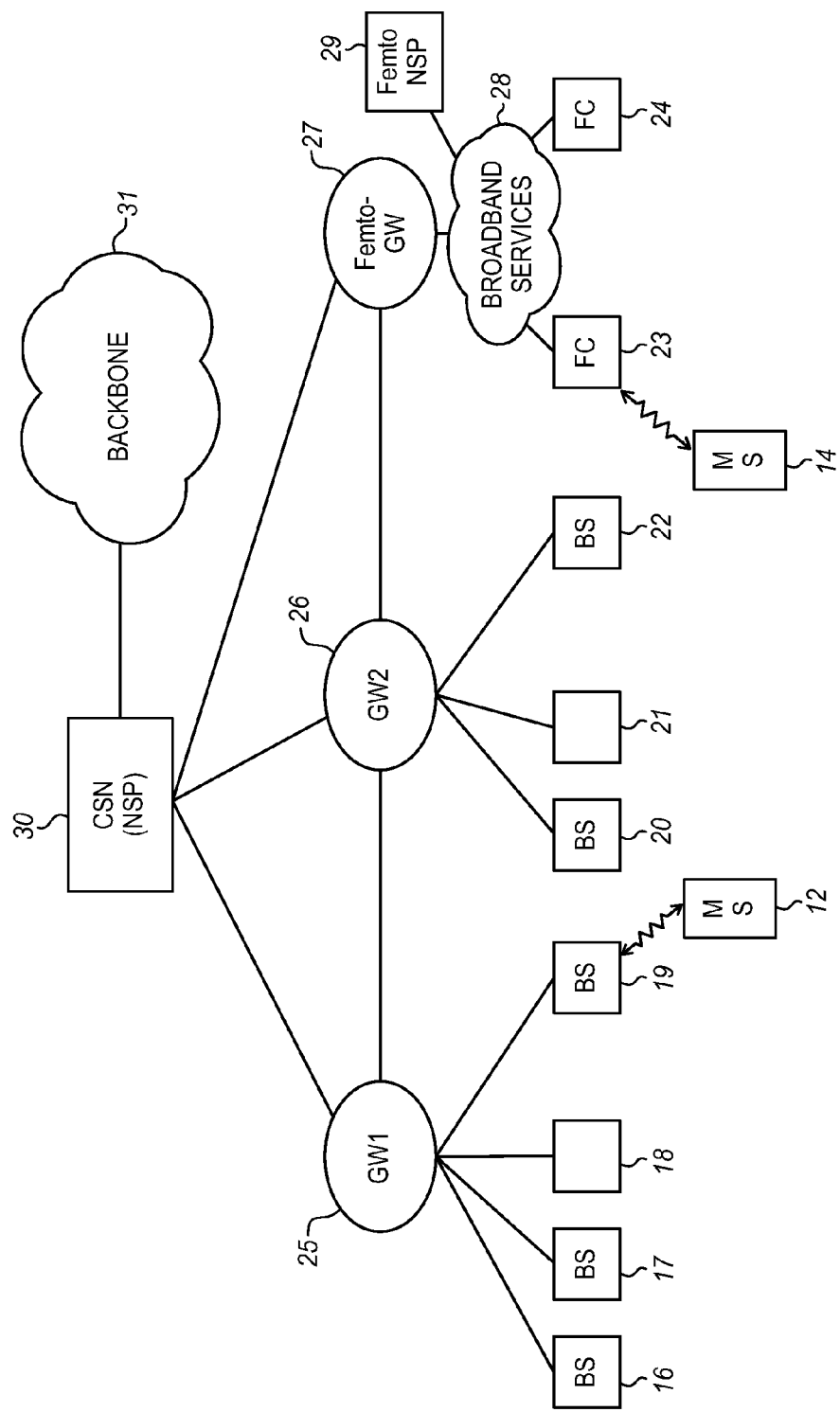
FIG. 1 is a diagram of a wireless radio system suitable for implementation of an embodiment of the present invention.

FIG. 1 shows an example of a cellular radio system 10. MSs 12, 14 can be mobile or fixed and can take the form of cellular telephones, netbooks, personal computers, media players, appliances, or any of a variety of other wireless connected devices. The MS can also be referred to as a subscriber station, remote station, terminal or by other terms.

A number of base stations (BS) 16-22 are provided in the system to provide connections for the MSs. The BS can take a variety of different forms and may cover large or small areas and transmit powers, depending on the application. While the BSs are shown as being similar in FIG. 1, they may be connected and configured differently from each other as well. In some applications, a network access point or an MS peer may act or function as a BS. In the illustrated example, the first MS is registered with a BS 19. This registration allows the MS to communicate with the BS to support all of the services that the MS and the system support.

Each BS 16-22 is connected to a gateway (GW) 25, 26. Each gateway supports several BSs. The gateways may or may not be connected to each other and are all connected directly or indirectly to a Connectivity Service Network (CSN) for a Network Service Provider (NSP) 30. There may be one or more CSNs in any one system. The CSN is coupled to a telephony backbone 31 that provides access to other telephony systems, data servers and services and more. In some instances a BS may be connected directly to the CSN through the backbone instead of through a gateway.

A third gateway 27 is also connected to the other gateways and to the CSN. This gateway is a femto gateway to support one or more femtocells 23, 24. The femtocells are coupled to the Femto-GW through a secure tunnel through broadband services 28. In a typical example, the femtocell is located at a home or small business and is coupled through cable or DSL (Digital Subscriber Line) services to the Femto-GW. However, any other broadband service may be used including services of the NSP for the cellular radio system. In that case, the femtocell can connect through a BS 16-22. A second MS 14 is connected to and registered with a femtocell 23 for wireless data services.

In addition to the Femto-GW, the femtocells 23, 24 are also connected through a secure tunnel through the broadband services to a Femto NSP 29. The Femto NSP provides services that are specific to femtocells and not normally provided by the CSN as described in more detail below. As an alternative to the illustrated architecture, the Femto NSP may be incorporated into the Femto-GW or the CSN or into some other system.

In the illustrated example, system administration and management can be distributed between the BS, GW, Femto NSP, and NSC in a variety of different ways. For communications, the first MS 12 can communicate with the second MS through the respective connected BS and GW. If both MS were registered at the same BS or femtocell, the BS may be able to support communications without routing through the GW. Similarly, if the second MS were connected to another system, NSP or ISP (Internet Service Provider), then the two MSs can communicate through the backbone 31.

FIG. 1 shows one example network, however, the present invention can be applied to a wide range of different network configurations and communications can be routed differently to suit different situations and applications.

Figure 2:
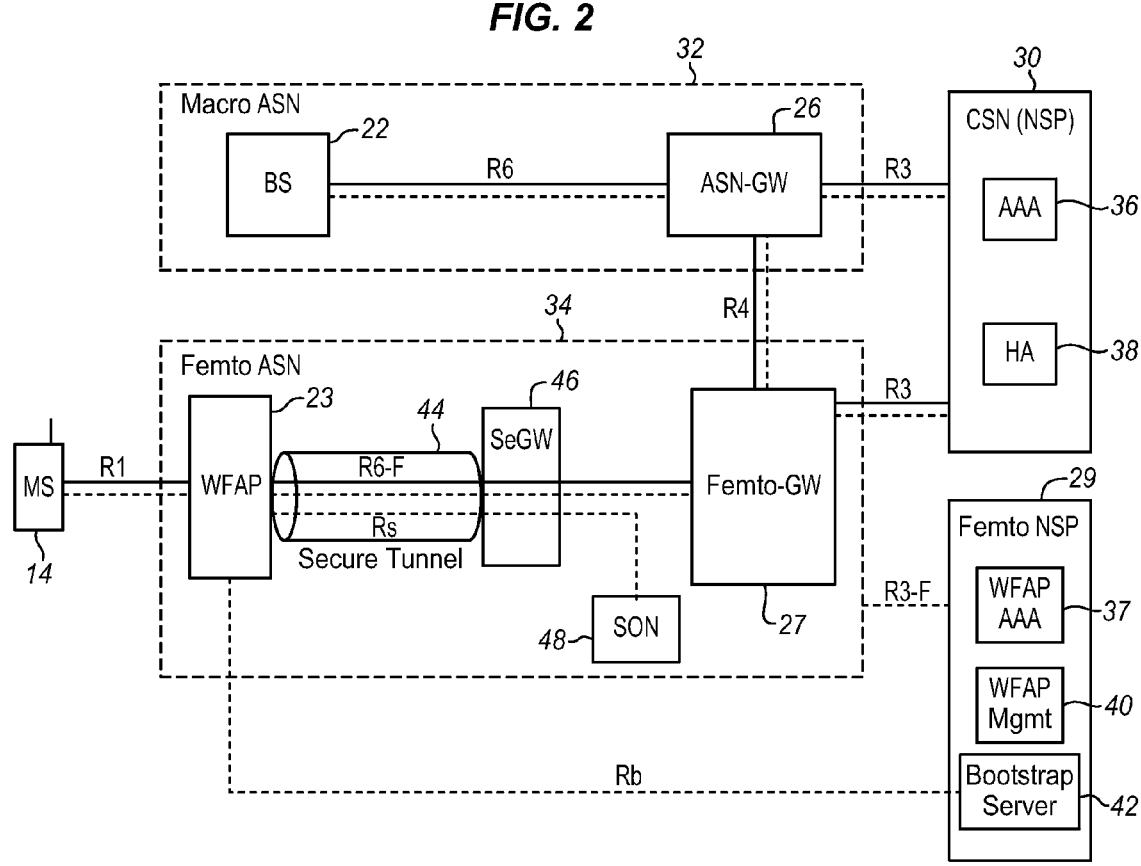
FIG. 2 is a diagram of a femto access service network in the context of a cellular radio communications system according to an embodiment of the invention.

FIG. 2 shows elements of the femtocell and its supporting infrastructure in more detail. It also shows aspects of a conventional base station 22 coupled to a gateway 26 for comparison. The BS and GW form a Macro ASN (Access Service Network) 32 for serving larger areas with higher power radio communications. This can be compared to a Femto ASN 34 for serving smaller areas with lower power radio communications. Both ASNs are coupled to the CSN (NSP) 30 through an R3 interface. The CSN 30 has an AAA (Authentication, Authorization and Accounting) server 36 and a home agent 38 for connecting to other networks.

The Femto ASN has a Femto-GW 27 coupled to the CSN and also to other GWs 26 in the cluster through an R4 connection. However, rather than a conventional BS 22, the Femto-GW is coupled to a femtocell 23. In this case, the femtocell takes the form of a WiMAX Femtocell Access Point (WFAP), which connects to the MS 14 through a WiMAX radio interface R1. The WFAP takes the form of inexpensive, low power, customer premises equipment (CPE) that may also be owned and operated by the customer within the constraints of the ASN.

The Femto-GW 34 plays the same role as the traditional ASN-GW 26 except that it is managing WFAPs 23 instead of regular macro-BSs 22. Therefore, it supports all the existing functionalities of ASN-GW. Its main functions are to terminate R6-F communications from the WFAP and to support the additional functionalities for femtocells, as described below.

The WFAP connects to the Femto-GW through a secure tunnel 44 using an R6-F interface. R6-F is a version of the R6 interface adapted specifically for use with secure tunnels and femtocells. The secure tunnel can be through any type of broadband service, including wired and wireless services.

As shown in FIG. 2, the Femto ASN 34 includes new functional entities that are not part of the Macro ASN 32. The Femto ASN is also provided with support from a Femto NSP 29 which is connected and operates as described below. The Femto ASN new functional entities include a security gateway (SeGW) 46 and a self-organizing networks (SON) server 48. The SeGW provides IPsec (Internet Protocol Security) tunnels for the WFAP and is responsible for authentication and authorization of the WFAP. The Femto-GW controls the WFAP and communicates user data packets between the WFAP and the CSN.

The SeGW is used for providing security over the public backhaul links of cable and DSL broadband interfaces. It connects directly between the secure tunnel from the WFAP and the Femto-GW. It also connects directly between the WFAP and the SON server. The SeGW may be implemented as a separate physical box or integrated together with other functional entities in a single physical box, for example, with a Femto-GW.

The SeGW can be used to terminate tunneling for the femtocell 23. In one example the tunneling is IPsec (Internet Protocol Security) tunneling, however, other techniques and protocols for establishing a secure connection with the femtocell may be used. It can also filter out unauthorized traffic on the links between the Security Gateway and the WFAP. This can include known malicious traffic as well as unauthorized users, advertisements, and other traffic controls. The SeGW can perform access control of the WFAP to the network, including the ASN-GW and the CSN, and even including inspecting data packets from the WFAP over R6 to the femtocell to verify that each packet has a correct source ID. Additional security functions can be provided such as encryption of the data between the WFAP and the SeGW in either or both directions and integrity protection. In one embodiment the SeGW can also provide NAT (Network Address Translation) traversal and other routing and addressing functions.

For WiMAX, Self-Organizing Networks (SON) is a process that involves Network Elements (NEs) in Radio Access Networks (RAN) and Core networks to enable automatic configuration, to measure and analyze performance data, and to fine tune network attributes in order to achieve optimal performance.

The SON server 48 provides the capabilities of self-optimization for the radio layers of the WFAP. This includes performance management, fault management and interference management of the WFAP radio layers. SON provides the ability to perform certain functions automatically without any human or manual intervention by evaluating dynamic and real time behavior. The evaluations are then used to manage functions related to the air interface aspects of the WFAPs. The SON server communicates with WFAPs to configure and manage the MAC (Media Access Control) and PHY (Physical) layers of the air interface. They are also used for initial configuration and ongoing re-configuration based on the locations and surrounding radio environments of each WFAP. The radio environment can include other WFAPs, Macro BSs, and external interferers.

In some examples the SON server collects location information for each WFAP as well as interference measurements. It can then pass the measurements on to an interference function to directly manage interference. This can include changing radio parameters at the WFAPs or the MSs, such as power levels, frequencies, subchannel use, etc. These abilities to directly detect and correct issues can be used to manage, reduce, and correct fault conditions over the radio links. While the SON server is shown as an autonomous device, it may be a part of the Femto-GW, the SeGW or the Femto NSP. It may alternatively be coupled to any of these devices for management and control.

As shown in FIG. 2, the Femto-GW 27 is connected not only to the CSN (NSP) 30 but also to a femto NSP. These can be housed in the same location or in different locations. There may be many more femto-NSPs in order to provide more direct service to the femto-GWs. The femto-NSP 29 is a service provider network for the femtocells. It contains a WFAP AAA (Authentication, Authorization and Accounting) 37, a WFAP management server 40, and a bootstrap server 42.

The WFAP AAA 37 contains subscription information for the WFAPs deployed in the femto ASN that the femto-NSP controls. It maintains the WFAP subscription information. It is also involved in the authentication and authorization of the WFAP. It performs the authentication and authorization of the WFAP for the NSP that is responsible for MS user's subscriptions. The WFAP performs functions similar to a AAA server 36 in the CSN, however, adapted specifically for femtocell purposes.

The management server 40 is used for configuring the management attributes of the WFAP such as FCAPS (Fault, Configuration, Accounting Performance and Security), O&M (Operations and Maintenance) information etc.

The bootstrap server 42 is used for initial bootstrap of the WFAP once it powers up. The WFAP is typically provisioned with enough information so that once it powers up and obtains IP connectivity over the public backhaul, the WFAP can connect back to the bootstrap server and get bootstrapped with basic information such as the IP address of the nearest SeGW etc.

In one example, upon initial installation, the WFAP accesses a pre-provisioned or acquired address for a bootstrap server. This server is accessed over the broadband services. After initial contact, a secure tunnel can be established, identifying information can be exchanged, and the WFAP can be directed to an appropriate SeGW or femtoGW. As shown in FIG. 2, there is a separate Rb connection between the WFAP and the bootstrap server to facilitate the original connection. The WFAP can also obtain any necessary network configuration parameters during the initial bootstrap process. After the bootstrap process, the WFAP will typically connect directly to the Femto-GW and the SON server.

By dividing the system using a Femto ASN 34 and a Femto NSP 29 different types of business models can be supported. This allows a WiMAX service provider flexibility to support a wide range of different locations and deployments using femtocells. By separating the Femto NSP from the CSN, a Femto NSP can be provided by a different business entity than the provider of the Femto ASN and Macro ASN 32. This allows, for example, a business campus to deploy femtocells around the campus that connect to an ASN and a NSP that it or a service provider maintains and operates. Through the R4 and R3 connections, however the femtocell network can connect directly to a major WiMax CSN, if desired.

Apart from the traditional interfaces and reference points provided for in WiMAX, the present invention provides new reference points. These reference points set out a secure architecture that can be used as a reference model for secure and standardized communication and management with femto cells.

First, R6-F is used for connectivity between the WFAP and the SeGW to the femto-GW. The Reference Point R6-F may have a Control Plane and a Bearer Plane or Data Plane for supporting femto specific features and the existing features of R6. To support IPSec tunneling, the Control Plane can use a WiMAX header over UDP (User Datagram Protocol) over IP over IPSec. For the Bearer Plane GRE (Generic Routing Encapsulation) over IP can be used. However a wide range of tunneling and security technologies can also be used instead of those listed. In WiMAX, IP is used in many of the connection to ease interoperation with other networking technologies. However, for other systems, or later versions of WiMAX, different protocols and formats can be used instead or in addition to IP.

A second new reference point is Rs which is used for communications with the SON server 48. Rs is a secure interface that can be routed through the SeGW 46. Security can be provided using UDP over IP or in any other suitable way. Since communications are routed through the SeGW and the SON server, the particular protocols can be modified without affecting the WFAP 23, if desired.

Rb is used for initial bootstrapping of WFAP via bootstrap server. It allows the SFAP to obtain the initial configuration from the bootstrap server. An HTTP or similar protocol can be used initially, then augmented with a conventional Internet security system, such as HTTPS. In one embodiment, the bootstrapping is the only operation that happens outside of the security zone on the Rb interface. The rest of the WFAP operations such as SON, management etc. happen within the security zone of the overall WiMAX system.

R3-F is based on R3, modified for connectivity of a femto-ASN to a femto-NSP. It can be used for things like management of the WFAP, WFAP usage authorization, authentication, and accounting etc. R3-F may include management plane protocols to communicate with the management system.

FIG. 3 shows an example of a hardware configuration that can be used for both a WFAP base station and a mobile station to implement the communications described above. A similar architecture can also be used for a gateway. In FIG. 3, the station 50 is driven by a processor 52. This can be a small, low power processor in the case of a MS or a high power, high speed processor in the case of a WFAP.

The processor has a memory bus that is coupled to a memory 56, such as magnetic, optical, or solid state memory or some combination thereof. The memory contains programming instructions and user data that can be sent and received between stations. Account data 58 can also be connected to the bus. For the MS, this can include a SIM (Subscriber Identity Module) and other stored personal parameters. For the BS this can include account authorization databases or connections to such databases.

A suite of sensors 54, such as positioning sensors, battery or power sensors, cameras and microphones, and transceiver signal sensors are coupled to the processor to provide additional data to the processor.

A user interface bus, such as USB (Universal Serial Bus) or another type of user interface connection connects the processor to a user interface 60, such as a keyboard, touch screen, mouse, trackball, or other interface, a display 62, and other connectors 64 to allow other devices to be connected. The particular user interface can be adapted to suit the particular application. A user can enter or attach text or other short messages through the user interface and can use the interface for system maintenance and control. For a MS, the user can, through the interface, make recordings with the microphone and camera and attach them to short messages that are commanded to be sent to a specific user or group of users using the keyboard or touch screen.

The processor 52 is coupled to another communications bus for communications with other devices. A wired interface 66 allows a BS to communicate with other BS's, gateways, base station controllers, operations and maintenance centers, etc. For the BS, the wired interface can allow for network connections and for a portable device, it may allow the device to be coupled to a personal computer for updates and maintenance. The communications bus also provides for wired or wireless connections to a personal area network (PAN) 68, such as Bluetooth, a local area network (LAN) 70 such as Wi-Fi, and a wide area network 72, or metropolitan area network such as 802.16m. More or fewer network adapters may be provided, depending on the application. Some network functions may be consolidated or separated, and a variety of different communications protocols and configurations may be used.

The wide area network (WAN) adapter 72 includes logic 74 to generate, assemble, encode, encrypt, and queue packets to be sent through the WAN. The logic is coupled to a transceiver 76 to modulate, encode, and amplify the packets from the logic for transmission through an antenna 78 over the WAN. The antenna may have one or more elements, depending on performance, cost and design considerations. The same transmit chain can also function as a receive chain or a separate receive chain (not shown) can be used. The receive chain would perform the reciprocal functions of receiving demodulating, amplifying, parsing, decoding, etc. to obtain data to send back to the processor over the communications bus.

In the case of receiving a packet with control messages, the messages are sent to the processor and are then used to adjust operation parameters or call routines for registration, call initiation, etc. In the case of receiving a packet with a user message, the message is sent to the processor and is then provided to the user on the display. In either case, the messages may be stored in memory.

The configuration of FIG. 3 can also be applied to a portable or desktop computer equipped with a wireless adapter. The WAN adapter 72 can be provided as a separate component on USB, a PCI (Peripheral Component Interconnect) bus, or any other suitable bus, or it can be provided as an internal system component.

A lesser or more equipped communications station 50 than the example described above may be desirable for certain implementations. Therefore, the configuration of the system will vary from implementation to implementation depending upon numerous factors, such as price constraints, performance requirements, technological improvements, and/or other circumstances.

Embodiments of the present invention have been described in the context of WiMAX and 802.16m and particular messages within that communications protocol and standard, however, the invention is not so limited. Embodiments of the present invention can be applied to other communications protocol and other types of control messages within 802.16m and other protocols in order to allow short user messages to be transmitted with little impact on overall system operation.

While the steps described herein can be performed under the control of a programmed processor, such as the processor 52, in alternative embodiments, the steps can be fully or partially implemented by any programmable or hard coded logic, such as Field Programmable Gate Arrays (FPGAs), TTL logic, or Application Specific Integrated Circuits (ASICs), for example. Additionally, the method of the present invention can be performed by any combination of programmed general purpose computer components or custom hardware components. Therefore, nothing disclosed herein should be construed as limiting the present invention to a particular embodiment wherein the recited steps are performed by a specific combination of hardware components.

The present invention can be provided as a computer program product that can include a machine-readable medium having instructions stored thereon, which can be used to program a computer (or other machine) to perform a process according to the present invention. The machine-readable medium can include, but is not limited to, floppy diskettes, optical disks, CD-ROMs, and magneto-optical disks, ROMs, RAMs, EPROMs, EEPROMs, magnet or optical cards, flash memory, or any other type of medium suitable for storing electronic instructions.

In the present description, for the purposes of explanation, numerous specific details are set forth in order to provide a thorough understanding of the present invention. However, the present invention can be practiced without some of these specific details. In other instances, well-known structures and devices are shown in block diagram form. The specific detail can be supplied by one of average skill in the art as appropriate for any particular implementation.

Although this disclosure describes illustrative embodiments of the invention in detail, it is to be understood that the invention is not limited to the precise embodiments described. The specification and drawings are, accordingly, to be regarded in an illustrative rather than a restrictive sense. Various adaptations, modifications and alterations may be practiced within the scope of the invention defined by the appended claims.

What is claimed is:

1. An apparatus comprising:
   a femto access service network (ASN) having an access point (AP) to communicate with subscribers within a femtocell and a femto gateway to communicate with a cellular radio communications system connectivity service network (CSN) through a secure gateway and an organizing server to provide radio parameters to the AP for operating the communications with subscribers; and
   a femto network service provider (NSP) as a part of the cellular radio communications system for serving the femto ASN,
   wherein the organizing server is coupled to a plurality of APs to organize radio parameters for initial configuration and with ongoing communication to reduce interference between the plurality of APs, and
   wherein the organizing server further communicates with the APs to configure and manage media access control and physical layers of the APs' air interfaces.

2. The apparatus of claim 1, further comprising a macro ASN having a base station to communicate with mobile data subscribers within a macrocell and a macro gateway to communicate between the base station and the CSN.

3. The apparatus of claim 2, wherein the femto gateway is connected to the macro gateway to communicate subscriber traffic.

4. The apparatus of claim 1, wherein the femto NSP further comprises an authorization, authentication, and accounting server to authorize and authenticate the AP.

5. The apparatus of claim 1, wherein the femto ASN comprises a security gateway between the femto gateway and the AP to secure communications between the femto gateway and the AP.

6. The apparatus of claim 5, wherein the security gateway maintains a secure tunnel between the security gateway and the AP.

7. The apparatus of claim 6, wherein the secure tunnel traverses an internet connection.

8. The apparatus of claim 1, wherein the femto NSP further comprises an organizing server to for performance and interference management of connected APs.

9. An apparatus comprising:
   a femto access service network (ASN) having an access point (AP) to communicate with subscribers within a femtocell and a femto gateway to communicate with a cellular radio communications system connectivity service network (CSN) through a secure gateway; and
   a femto network service provider (NSP) as a part of the cellular radio communications system for serving the femto ASN,
   wherein the femto ASN further comprises an organizing server to provide radio parameters to the AP for operating the communications with subscribers,
   wherein the organizing server is coupled to a plurality of APs to organize radio parameters for initial configuration and with ongoing communication to reduce interference between the plurality of APs,
   wherein the organizing server further communicates with the APs to configure and manage media access control and physical layers of the APs' air interfaces; and
   wherein the AP accesses a bootstrap server using a pre-provisioned address and is directed to the secure gateway by the bootstrap server.

10. The apparatus of claim 9, wherein the femto ASN comprises a security gateway between the femto gateway and the AP to secure communications between the femto gateway and the AP and wherein the organizing server is coupled to the AP through the secure gateway.

11. An apparatus comprising:
    a wireless access point having a first communications interface for wireless communications with a subscriber unit and a second communications interface for communications with a cellular radio communications system;
    a network connection to a management server to receive radio parameters for initial configuration and with ongoing communication to reduce interference between the plurality of APs; and
    a secure gateway between the access point and the cellular system to secure communications between the access point and the cellular system;
    wherein the wireless access point further receives parameters from the management server to configure and manage media access control and physical layers of the wireless access point's air interfaces.

12. The apparatus of claim 11 further comprising a network connection to a bootstrap server for initial configuration of the access point, wherein the wireless access point accesses the bootstrap server using a pre-provisioned address and is directed to the secure gateway by the bootstrap server.

13. The apparatus of claim 11, further comprising a secure tunnel between the access point and the secure gateway.

14. The apparatus of claim 13, wherein the secure tunnel uses internet protocol security to secure communications through the tunnel.

15. The apparatus of claim 13, wherein the secure tunnel is through broadband services separate from the cellular system.

16. The apparatus of claim 15, wherein the broadband services are operated by an internet service provider.

17. The apparatus of claim 11, wherein the second communications interface is to a gateway of the cellular system, the gateway being coupled to other gateways of the cellular system.

18. The apparatus of claim 17, wherein the gateway is coupled to a gateway of a macrocell of the cellular system.

* * * * *